(12) United States Patent
Hilker

(10) Patent No.: US 9,141,337 B2
(45) Date of Patent: Sep. 22, 2015

(54) FLOATING POINT MULTIPLY ACCUMULATOR MULTI-PRECISION MANTISSA ALIGNER

(75) Inventor: Scott Hilker, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 913 days.

(21) Appl. No.: 13/226,071

(22) Filed: Sep. 6, 2011

(65) Prior Publication Data

US 2013/0060828 A1    Mar. 7, 2013

(51) Int. Cl.
*G06F 7/483* (2006.01)
*G06F 5/01* (2006.01)
*G06F 7/544* (2006.01)
*G06F 7/485* (2006.01)
*G06F 7/487* (2006.01)

(52) U.S. Cl.
CPC *G06F 7/483* (2013.01); *G06F 5/01* (2013.01); *G06F 7/5443* (2013.01); *G06F 7/485* (2013.01); *G06F 7/4876* (2013.01); *G06F 2207/382* (2013.01)

(58) Field of Classification Search
None
See application file for complete search history.

(56) References Cited

U.S. PATENT DOCUMENTS 6,571,266 B1 *   5/2003   Bass .............................. 708/501
2002/0194239 A1 *  12/2002  Pangal ........................... 708/498

* cited by examiner

*Primary Examiner* — Michael D Yaary

(57) ABSTRACT

A processing device is provided that includes a first, second and third precision operation circuit. The processing device further includes a shared, bit-shifting circuit that is communicatively coupled to the first, second and third precision operation circuits. A method is also provided for multiplying a first and second binary number including adding a first exponent value associated with the first binary number to a second exponent value associated with the second binary number and multiplying a first mantissa value associated with the first binary number to a second mantissa value associated with the second binary number. The method includes performing the exponent adding and mantissa multiplying substantially in parallel. The method further includes performing at least one of adding or subtracting a third binary number to the product. Also provided is a computer readable storage device encoded with data for adapting a manufacturing facility to create an apparatus.

12 Claims, 6 Drawing Sheets

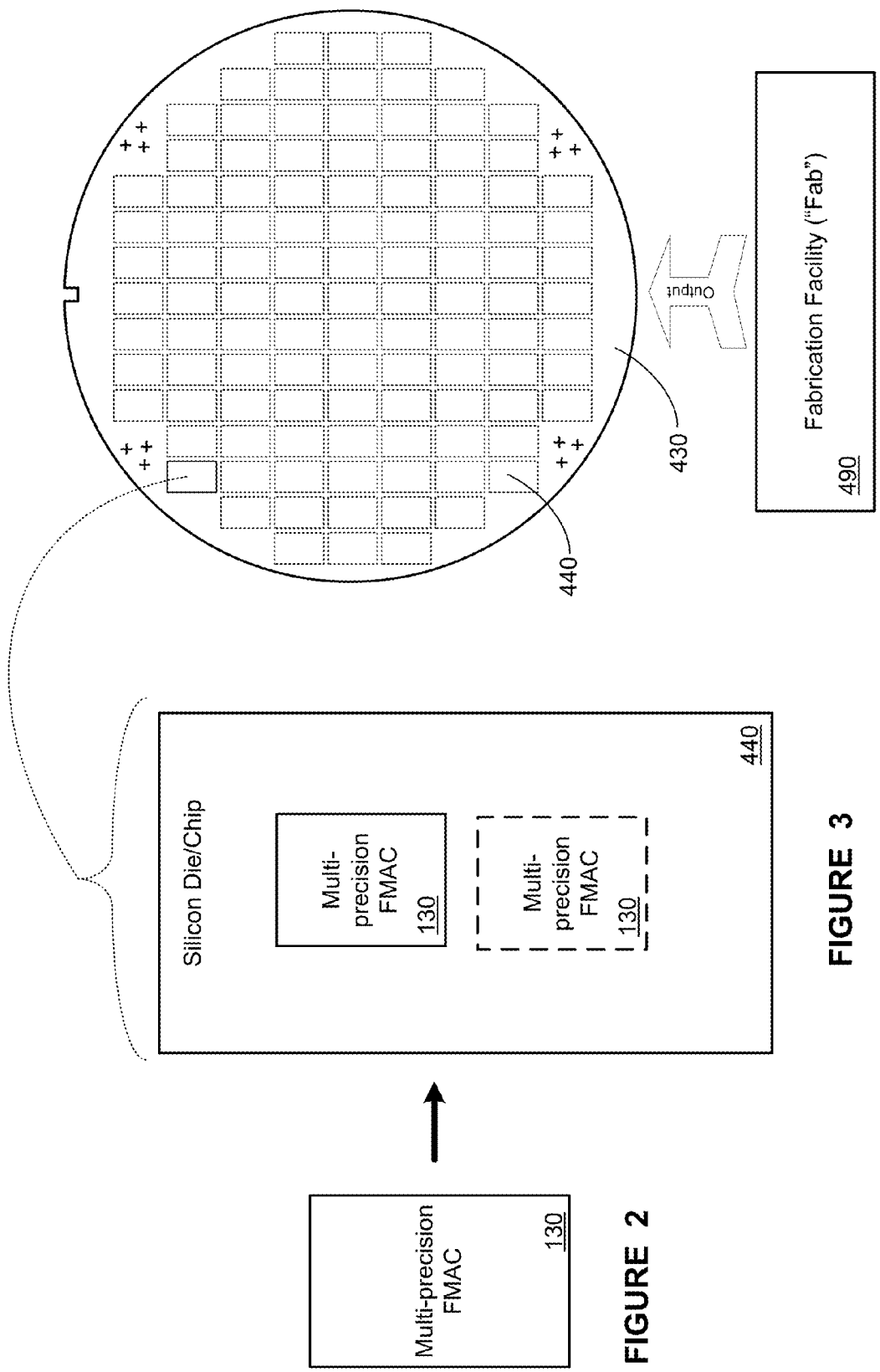

FLOATING POINT MULTIPLY ACCUMULATOR MULTI-PRECISION MANTISSA ALIGNER

BACKGROUND

1. Field of the Invention

Embodiments of this invention relate generally to processors and processing circuits, and, more particularly, to a method and apparatus for a floating point multiply accumulator (FMAC) multi-precision mantissa aligner.

2. Description of Related Art

Processors and processing circuits have evolved becoming faster and more power intensive. With increased speed and capabilities, processors and processing circuits must be adapted to be run more efficiently and with greater flexibility. As technology for these devices has progressed, there has developed a need for performance and efficiency improvements. However, complexity, power and performance considerations introduce substantial barriers to these improvements. Additionally, circuit area and circuit overhead requirements (e.g., routing and layout) provide barriers to improvements.

Multi-precision mantissa alignment may alleviate or reduce the abovementioned barriers to power reduction, efficiency and flexibility. In modern implementations for FMACs, support for two parallel single-precision operations embedded in a higher precision datapath is not found. State of the art FMACs are thus incapable of improving power usage, overhead, efficiency and flexibility through the use of parallel single-precision operations.

SUMMARY OF EMBODIMENTS OF THE INVENTION

In one aspect of the present invention, a processing device is provided. The processing device includes a first, second and third precision operation circuit. The processing device further includes a shared, bit-shifting circuit that is communicatively coupled to the first, second and third precision operation circuits.

In another aspect of the invention, a method is provided. The method includes multiplying a first binary number and a second binary number to obtain a product, where multiplying includes adding a first exponent value associated with the first binary number to a second exponent value associated with the second binary number to obtain an exponent sum and multiplying a first mantissa value associated with the first binary number to a second mantissa value associated with the second binary number. The method also includes that the exponent adding and the mantissa multiplying are performed substantially in parallel. The method further includes performing at least one of adding a third binary number to the product or subtracting the third binary number from the product.

In yet another aspect of the invention, a computer readable storage device encoded with data that, when implemented in a manufacturing facility, adapts the manufacturing facility to create an apparatus is provided. The apparatus includes a first, second and third precision operation circuit. The apparatus further includes a shared, bit-shifting circuit that is communicatively coupled to the first, second and third precision operation circuits.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which:

FIG. 2 shows a simplified block diagram of multi-precision FMAC, according to one embodiment;

FIG. 3 provides a simplified block diagram of multi-precision FMAC(s) on a silicon die/chip, according to one embodiment;

FIG. 4 illustrates an exemplary detailed representation of a multi-precision FMAC produced in a semiconductor fabrication facility, according to one embodiment;

Figure 1:
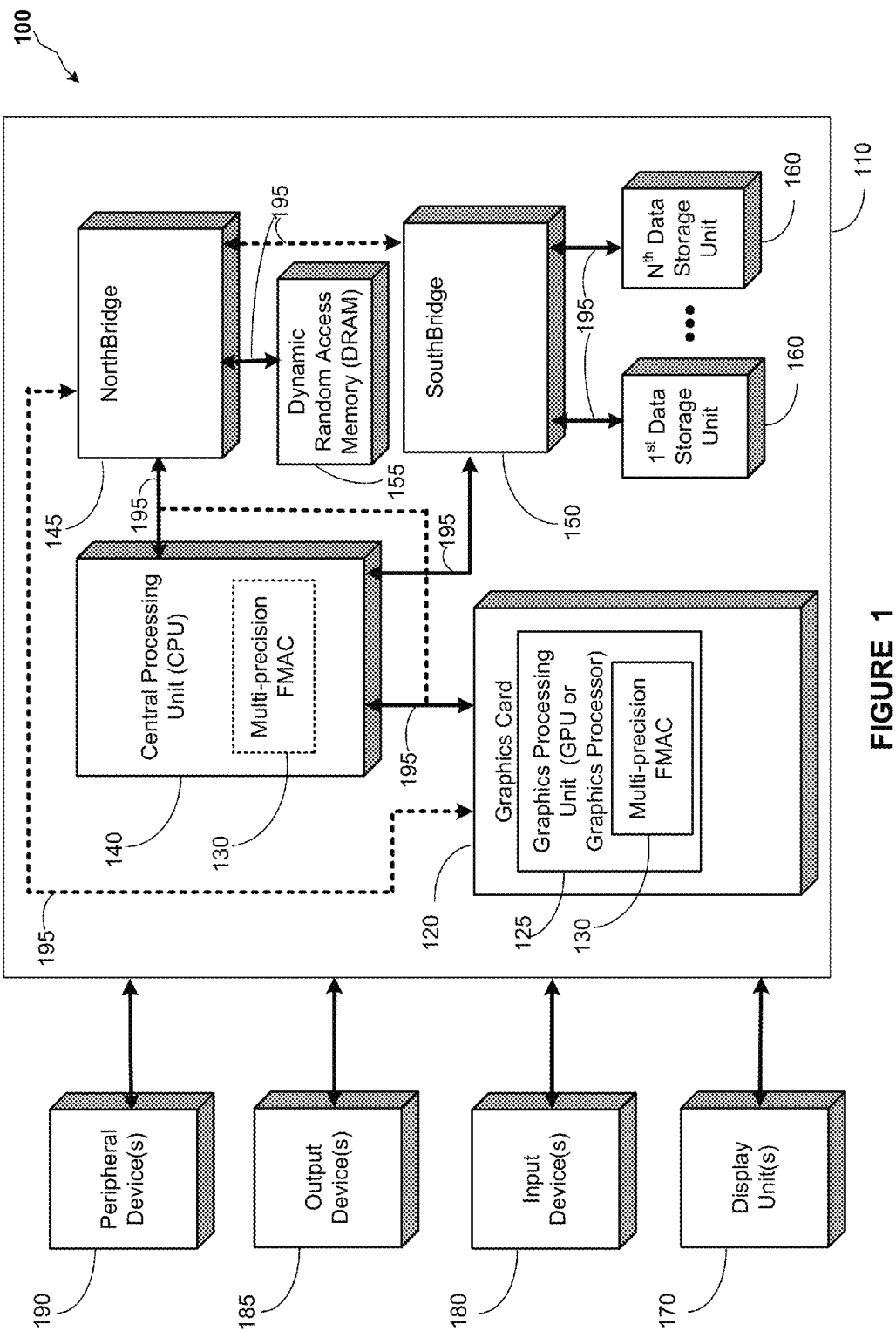
FIG. 1 schematically illustrates a simplified block diagram of a computer system including one or more FMACs, according to one embodiment.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

Embodiments of the present invention will now be described with reference to the attached figures. Various structures, connections, systems and devices are schematically depicted in the drawings for purposes of explanation only and so as to not obscure the disclosed subject matter with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

As used herein, the terms "substantially" and "approximately" may mean within 85%, 90%, 95%, 98% and/or 99%. In some cases, as would be understood by a person of ordinary skill in the art, the terms "substantially" and "approximately" may indicate that differences, while perceptible, may be negligent or be small enough to be ignored.

Embodiments of the present invention generally provide for methods and apparatus for a floating point multiply accumulator (FMAC) multi-precision mantissa aligner. It is contemplated that various embodiments described herein are not mutually exclusive. That is, the various embodiments described herein may be implemented simultaneously with, or independently of, each other, as would be apparent to one of ordinary skill in the art having the benefit of this disclosure. The embodiments described herein show a novel design that efficiently solves the problems described above. The embodiments described herein may utilize multi-precision mantissa alignment for a FMAC comprising two parallel single-precision (SP) operations (operation circuits), as well as an extended-/double-precision (EP/DP) operation (operation circuit). The Institute for Electrical and Electronics Engineers (IEEE) has set forth industry standards for SP, EP and DP operations. Binary numbers may be formatted such that they comprise two distinct portions: an exponent portion and a mantissa portion. SP operations use 23 bits for the mantissa and 8 bits for the exponent, EP operations use 64 bits for the mantissa and 64 bits for the exponent, and DP operations use 52 bits for the mantissa and 11 bits for the exponent. The embodiments described herein may allow for decreased latency in floating point multiply-add operations as well as higher throughput. The embodiments described herein may also allow for power and/or area optimization for floating point multiply-add circuits.

Turning now to FIG. 1, a block diagram of an exemplary computer system 100, in accordance with an embodiment of the present invention, is illustrated. In various embodiments the computer system 100 may be a personal computer, a laptop computer, a handheld computer, a tablet computer, a mobile device, a telephone, a personal data assistant ("PDA"), a server, a mainframe, a work terminal, or the like. The computer system includes a main structure 110 which may be a computer motherboard, circuit board or printed circuit board, a desktop computer enclosure and/or tower, a laptop computer base, a server enclosure, part of a mobile device, personal data assistant (PDA), or the like. In one embodiment, the main structure 110 may include a graphics card 120. In one embodiment, the graphics card 120 may be a Radeon™ graphics card from Advanced Micro Devices ("AMD") or any other graphics card using memory, in alternate embodiments. The graphics card 120 may, in different embodiments, be connected on a Peripheral Component Interconnect "(PCI") Bus (not shown), PCI-Express Bus (not shown) an Accelerated Graphics Port ("AGP") Bus (also not shown), or any other connection known in the art. It should be noted that embodiments of the present invention are not limited by the connectivity of the graphics card 120 to the main computer structure 110. In one embodiment, computer runs an operating system such as Linux, Unix, Windows, Mac OS, or the like.

In one embodiment, the graphics card 120 may contain a graphics processing unit (GPU) 125 used in processing graphics data. The GPU 125, in one embodiment, may include one or more embedded memories (not shown). In one embodiment, the embedded memory(ies) may be an embedded random access memory ("RAM"), an embedded static random access memory ("SRAM"), or an embedded dynamic random access memory ("DRAM"). In one or more embodiments, the embedded memory(ies) may be an embedded RAM (e.g., an SRAM). In alternate embodiments, the embedded memory(ies) may be embedded in the graphics card 120 in addition to, or instead of, being embedded in the GPU 125. In various embodiments the graphics card 120 may be referred to as a circuit board, a printed circuit board, a daughter card or the like.

In one embodiment, the computer system 100 includes a central processing unit ("CPU") 140, which is connected to a northbridge 145. The CPU 140 and northbridge 145 may be housed on the motherboard (not shown) or some other structure of the computer system 100. It is contemplated that in certain embodiments, the graphics card 120 may be coupled to the CPU 140 via the northbridge 145 or some other connection as is known in the art. For example, CPU 140, northbridge 145, GPU 125 may be included in a single package or as part of a single die or "chip(s)" (not shown). Alternative embodiments which alter the arrangement of various components illustrated as forming part of main structure 110 are also contemplated. The CPU 140, in certain embodiments, may include one or more multi-precision FMACs 130. The multi-precision FMACs 130 may include a multi-precision mantissa aligner comprising two or more parallel single-precision operation circuits (described below with respect to FIG. 5). In certain embodiments, the northbridge 145 may be coupled to a system RAM (or DRAM) 155; in other embodiments, the system RAM 155 may be coupled directly to the CPU 140. The system RAM 155 may be of any RAM type known in the art; the type of RAM 155 does not limit the embodiments of the present invention. In one embodiment, the northbridge 145 may be connected to a southbridge 150. In other embodiments, the northbridge 145 and southbridge 150 may be on the same chip in the computer system 100, or the northbridge 145 and southbridge 150 may be on different chips. In various embodiments, the southbridge 150 may be connected to one or more data storage units 160 using a data connection or bus 199. The data storage units 160 may be hard drives, solid state drives, magnetic tape, or any other writable media used for storing data. In one embodiment, one or more of the data storage units may be SATA data storage units and the data connection 199 may be a SATA bus/connection. Additionally, the data storage units 160 may contain one or more multi-precision FMACs 130. In various embodiments, the central processing unit 140, northbridge 145, southbridge 150, graphics processing unit 125, DRAM 155 and/or embedded RAM may be a computer chip or a silicon-based computer chip, or may be part of a computer chip or a silicon-based computer chip. In one or more embodiments, the various components of the computer system 100 may be operatively, electrically and/or physically connected or linked with a bus 195 or more than one bus 195.

In different embodiments, the computer system 100 may be connected to one or more display units 170, input devices 180, output devices 185 and/or other peripheral devices 190. It is contemplated that in various embodiments, these elements may be internal or external to the computer system 100, and may be wired or wirelessly connected, without affecting the scope of the embodiments of the present invention. The display units 170 may be internal or external monitors, television screens, handheld device displays, and the like. The input devices 180 may be any one of a keyboard, mouse, track-ball, stylus, mouse pad, mouse button, joystick, scanner or the like. The output devices 185 may be any one of a monitor, printer, plotter, copier or other output device. The peripheral devices 190 may be any other device which can be coupled to a computer: a CD/DVD drive capable of reading and/or writing to corresponding physical digital media, a universal serial buss ("USB") device, Zip Drive, external floppy drive, external hard drive, phone and/or broadband modem, router/gateway, access point and/or the like. To the extent certain exemplary aspects of the computer system 100 are not described herein, such exemplary aspects may or may not be included in various embodiments without limiting the spirit and scope of the embodiments of the present invention as would be understood by one of skill in the art.

In one embodiment, any number of computer systems 100 may be communicatively coupled and/or connected to each other through a network infrastructure. In various embodiments, such connections may be wired or wireless without limiting the scope of the embodiments described herein. The network may be a local area network (LAN), wide area network (WAN), personal network, company intranet or company network, the Internet, or the like. In one embodiment, the computer systems 100 connected to the network via the network infrastructure may be a personal computer, a laptop computer, a handheld computer, a tablet computer, a mobile device, a telephone, a personal data assistant (PDA), a server, a mainframe, a work terminal, any other computing device described herein, and/or the like. The number of computers connected to the network may vary; in practice any number of computer systems 100 may be coupled/connected using the network.

In one embodiment, computer systems 100 may include one or more graphics cards and/or graphics processing units (GPUs). The graphics cards 120 may contain one or more GPUs 125 used in processing graphics data. The GPU 125, in one embodiment, may include a multi-precision FMAC 130. In alternate embodiments, the multi-precision FMAC 130 may be embedded in the graphics card 120 in addition to, or instead of, being embedded in the GPU 125. To the extent certain exemplary aspects of the graphics card 120 and/or the GPU(s) 125 are not described herein, such exemplary aspects may or may not be included in various embodiments without limiting the spirit and scope of the embodiments of the present invention as would be understood by one of skill in the art. In one embodiment, the graphics processing unit 125 and multi-precision FMAC 130 may reside on the same silicon chip as the CPU 140 and/or the northbridge 145. In another embodiment, the multi-precision FMAC 130 may reside on the same silicon chip as the CPU 140. In such embodiments, the silicon chip(s) may be used in a computer system 100 in place of, or in addition to, the graphics card 120. The silicon chip(s) may be housed on the motherboard (not shown) or other structure of the computer system 100.

Turning now to FIG. 2, a simplified, exemplary representation of the multi-precision FMAC 130 which may be used in silicon die/chips 440, as well as devices depicted in FIG. 1, according to various embodiments, is illustrated. However, those skilled in the art will appreciate that the multi-precision FMAC 130 may take on any of a variety of forms, including those described herein, without departing from the spirit and scope of the instant invention Turning to FIG. 3, the silicon die/chip 440 is illustrated as including one or more the multi-precision FMACs 130. As discussed above, various embodiments of the multi-precision FMAC 130 may be used in a wide variety of electronic devices, including, but not limited to, central processing units, motherboards, graphics cards, graphics processors, combinatorial logic implementations, stand-alone controllers, other integrated circuits (ICs), digital signal processors (DSPs), and/or the like.

Turning now to FIG. 4, in accordance with one embodiment, and as described above, one or more of the multi-precision FMACs 130 may be included on the silicon die/chips 440 (or computer chip). The silicon die/chips 440 may contain one or more different configurations of the multi-precision FMACs 130 (e.g., a multi-precision FMACs 130 configured to include parallel SP operations/operational circuits). The silicon chips 440 may be produced on a silicon wafer 430 in a fabrication facility (or "fab") 490. That is, the silicon wafers 430 and the silicon die/chips 440 may be referred to as the output, or product of, the fab 390. The silicon die/chips 440 may be used in electronic devices, such as those described above in this disclosure.

Figure 5:
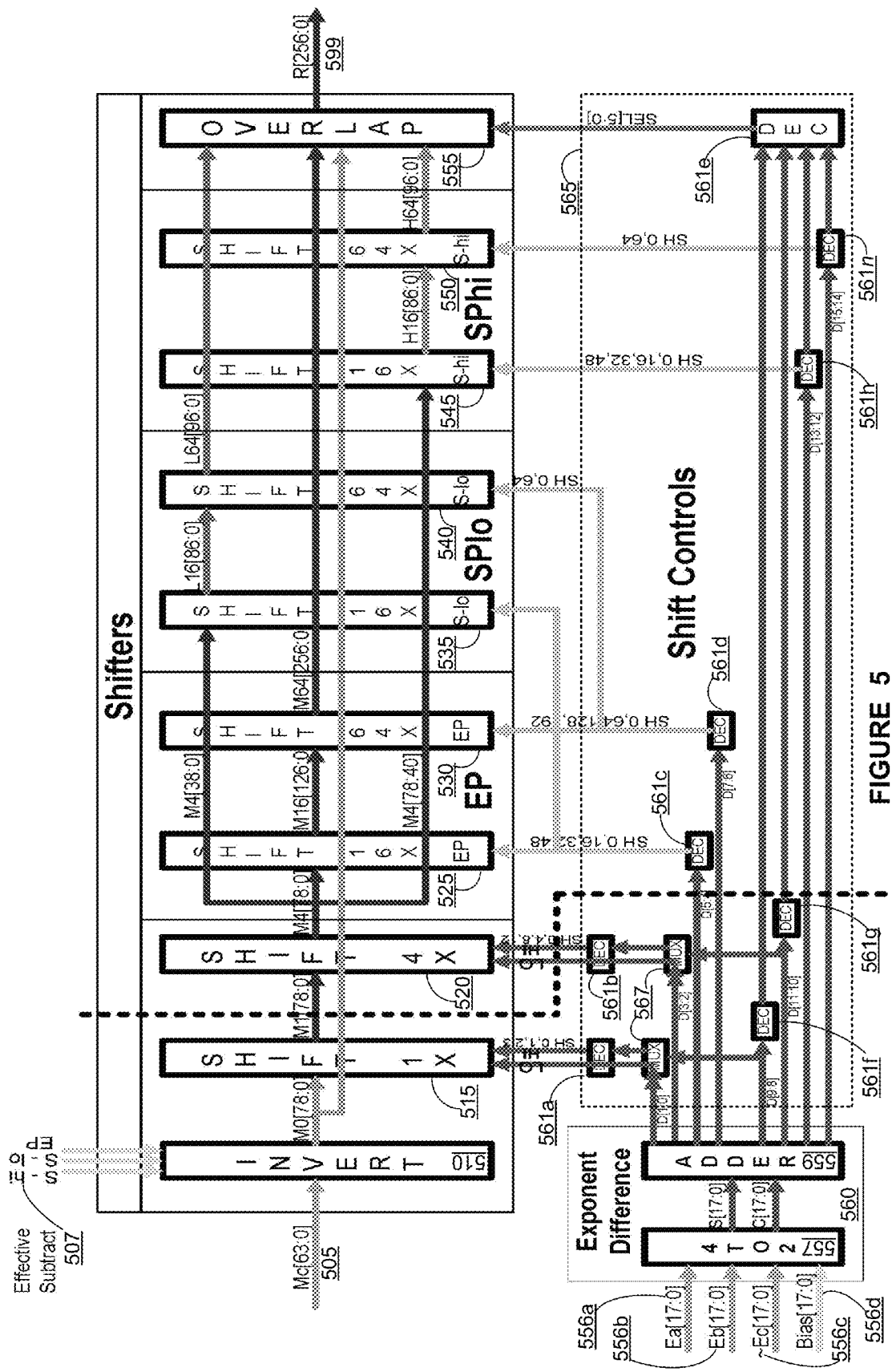
FIG. 5 illustrates a schematic diagram of an FMAC, according to one exemplary embodiment.

Turning now to FIG. 5, a diagram of an exemplary implementation of a portion of the multi-precision FMAC 130 is illustrated, according to one embodiment. For purposes of illustration, an exemplary FMAC multiply-add operation may be conceptualized as: A×B±C ("A multiplied by B, plus or minus C"). In order to multiply two binary numbers, their exponents may be added and their mantissas may be multiplied. Addition may require that exponents are "lined" up; in order to be added, numbers may need to have the same exponent. In order to accomplish this alignment/equalization, the mantissa of one or more operands may be shifted. By shifting the operand(s), the effective exponent of a number may be changed. For example, when adding $1.0 \times 10^3$ and $2.0 \times 10^2$ the exponents would need to be equalized. In one embodiment, $1.0 \times 10^3$ may be equalized with $2.0 \times 10^2$ by shifting the exponent $10^3$ making it $10^2$. The resulting number would then be $10 \times 10^2$. The numbers could then be added by adding mantissas (10+2), each having an exponent of "2", for a result of $12 \times 10^2$ (i.e., $1.2 \times 10^3$). In one or more embodiments, the FMAC 130 may comprise two parallel single-precision operation circuits such that the exponent addition and the mantissa multiplication (e.g., for multiplication operations) may be performed in parallel or substantially in parallel. Similarly, the shifting of one or more operand mantissas (e.g., for addition operations) may also be performed in parallel or substantially in parallel to the mantissa multiplication.

As previously described, in one or more embodiments, the multi-precision FMAC 130 may contain circuitry to perform multi-precision mantissa alignment and/or multi-precision mantissa alignment using two parallel single-precision operation circuits. The illustrated FMAC 130 may comprise shift blocks, shift blocks for extended precision (EP), double precision (DP) and/or single precision (SP). For purposes of the discussion herein, DP operations may be performed by the EP operations blocks. It should be noted, however, that in various embodiments, alternate DP operational blocks may be used. As described herein, a block may also be referred to as a circuit, circuit portion and/or circuit block. The illustrated exemplary FMAC 130 may comprise an invert block 510 configured to invert the addend mantissa Mc 505, a shift 1× block 515, a shift 4× block 520, an EP shift 16× block 525, an EP shift 64× block 530, an SP-lo shift 16× block 535, an SP-lo shift 64× block 540, an SP-hi shift 16× block 545, an SP-hi shift 64× block 550, and/or an overlap block 555. The invert block 510 may be configured to invert bits of the Mc 505 if subtracting the product and addend instead of adding. In one embodiment, the inversion may be controlled by the invert controls 507. The various shift blocks described herein may be adapted to, configured to, and/or capable of shifting a binary number (or number of another format) by a given number of bits. For example, a 1× shift block (e.g., shift 1× block 515) may shift a binary number a given number of times by a single bit. That is, a 1× shift block may shift a binary number by 0, 1, 2 or 3 bits. A 4× shift block (e.g., shift 4× block 520) may shift a binary number a given number of times by four (4) bits. That is, a 4× shift block may shift a binary number by 0, 4, 8 or 12 bits. A 16× shift block (e.g., EP shift 16× block 525, SP-lo shift 16× block 535 and/or SP-hi shift 16× block 545) may shift a binary number a given number of times by sixteen (16) bits. That is, a 16× shift block may shift a binary number by 0, 16, 32 or 48 bits. A 64× shift block (e.g., EP shift 64× block 530, SP-lo shift 64× block 540 and/or SP-hi shift 64× block 550) may shift a binary number a given number of times by sixty-four (64) bits. That is, a 64× shift block may shift a binary number by 0, 64, 128 or 192 bits. As described herein, shifting of bits may be performed by shifting zero ("0") or more bits; that is, if a determination is made that a binary number should not be shifted, it may be said that the binary number was shifted by zero ("0") bits. The overlap block 555 may, in one or more embodiments, be adapted to handle un-overlapped product and addend mantissa cases in the last aligner stage, as illustratively shown in FIG. 5. In the case that the addend mantissa shift will result in the addend mantissa not potentially overlapping with the product mantissa, then the addend mantissa is effectively concatenated with the product mantissa. The overlap block 555 may output a 256-bit result R 599.

The exemplary FMAC 130 illustrated in FIG. 5 may be conceptualized for illustrative purposes as shifting in four stages. In one embodiment, the first two stages may be shared. The shift 1× block 515 may be referred to as a first stage (i.e., shifting 0, 1, 2, or 3 bits) and the shift 4× block 520 may be referred to as a second stage (i.e., shifting 0, 4, 8, or 12 bits). These stages may be shared in that the output of the shift 1× block 515 and the shift 4× block 520 may be output to the EP (DP) shift 16× block 525, the SP-lo shift 16× block 535 and/or the SP-hi shift 16× block 545, as illustrated in FIG. 5, and/or may be output across the datapath to the three back end shifters of the FMAC 130 (i.e., to the EP (DP) aligner and/or one or both of the SP aligners, SP-lo and SP-hi, as described below with respect to FIG. 6). It is noted that the routing efficiency afforded by having the shared front end stages (i.e., shift 1× block 515 and the shift 4× block 520) allows the data to only have to traverse the full (vertical) length of the 64-bit datapath just once (from the shift 4× block 520 output to the EP (DP) shift 16× block 525, the SP-lo shift 16× block 535 and/or the SP-hi shift 16× block 545 inputs), thus optimizing/increasing routing efficiency. It should be noted that the least significant bits (LSBs) of the exponent differences for all calculations are naturally available first and thus may be used first to optimize the aligner for lowest latency (i.e., the finest 1× shifting; the first two LSBs [0:1], decoded by 00=shift 0, 10=shift 1, 01=shift 2 and 11=shift 3) may occur first, followed by the 4-bit shifting (the next two significant bits [2:3], decoded by 00=shift 0, 10=shift 4, 01=shift 8 and 11=shift 12), the 16-bit shifting (the next two significant bits [4:5], decoded by 00=shift 0, 10=shift 16, 01=shift 32 and 11=shift 48), and the 64-bit shifting (the next two significant bits [6:7], decoded by 00=shift 0, 10=shift 64, 01=shift 128 and 11=shift 192) as the more significant bits of the exponent differences become available.

The multi-precision FMAC 130 may comprise an exponent difference block 560 and a decoder block 565. The exponent difference block 560 and the decoder block 565 may be adapted to take one or more inputs from a system and, based at least in part on the inputs, determine the shifting schedule for the multi-precision FMAC 130 operations. The exponent difference calculation is affected in the exponent difference block 560. Based, at least in part, on the difference calculated between the exponents, the mantissa(s) may need to be shifted in order to have them align their respective binary points. The exponent difference block 560 may comprise a 4 to 2 adder/compressor 557 and/or a 2 to 1 carry propagate adder 559. The exponent difference block 560 may take as inputs: the exponent of term A (Ea) 556a, the exponent of term B (Eb) 556b, the exponent of term C (Ec) 556C, and a bias signal Bias 556d. The adder 557 and the adder 559 may, in one or more embodiments, perform an effective subtraction operation to determine the difference between the sum of the product exponents Ea 556 and Eb 556b, and the addend exponent Ec 556c. In one or more embodiments, the bias 556d may be adapted to bias the exponent values such that some or all of the shift operations in the FMAC 130 may be performed by shifting to the right, rather than shifting to the left as well as removing any additional bias in order to perform the calculation. The outputs of the exponent difference block 560 may be decoded using the block 565. The decoder block 565 may comprise one or more decoders (Dec) 561a-n and/or one or more multiplexors 567 in order to generate the necessary shift controls from the calculated exponent difference for all the aligner complex stages. In one embodiment, the multiplexors 567 may be 2-to-1 multiplexors and may be used to select between two exponent difference calculations ("Product minus Addend" and "Addend minus Product"). These two subtractions (differences) may be calculated in parallel using the carryout of one of the adders, and may be used to select which difference calculation is valid for the first two sets of 2-to-4 decoders for the four shift 1× controls and the four shift 4× controls described below. Calculating both differences in parallel and then selecting the proper difference may be done to further minimize latency.

For example, in one embodiment, the Dec 566a may output a control signal to the Shift 1× 515 that may indicate the two least significant bits of the output of the exponent difference block are to be decoded to determine the four shift controls for the Shift 1× 515 block (i.e., shift control bits [0:1], decoded as 00=shift 0, 10=shift 1, 01=shift 2 and 11=shift 3). Similarly, in one embodiment, the Dec 566b may output four shift control signals to the Shift 4× 520 that are decoded from bits [2:3] of the exponent difference block 560 (i.e., shift control bits [2:3], decoded as 00=shift 0, 10=shift 4, 01=shift 8 and 11=shift 12). It should be noted that "one-hot" select n-to-1 multiplexors and decoders (where n is the number of multiplexor inputs) may be used extensively for realizing the shifters Shift 1× 515, Shift 4× 520, etc. (e.g., n=4 for shifting by 0, 1, 2, or 3 bits, and n=4 for shifting by 0, 4, 8, or 12 bits; etc.). This use of standard cells may increase routing efficiency and decrease footprint area. It should be noted that the 64× shift stages are straight (i.e., horizontal) routes in the datapath. That is, the routing of the 64× shift stages is optimally done to minimize the distance traveled by these shift stages.

Figure 6:
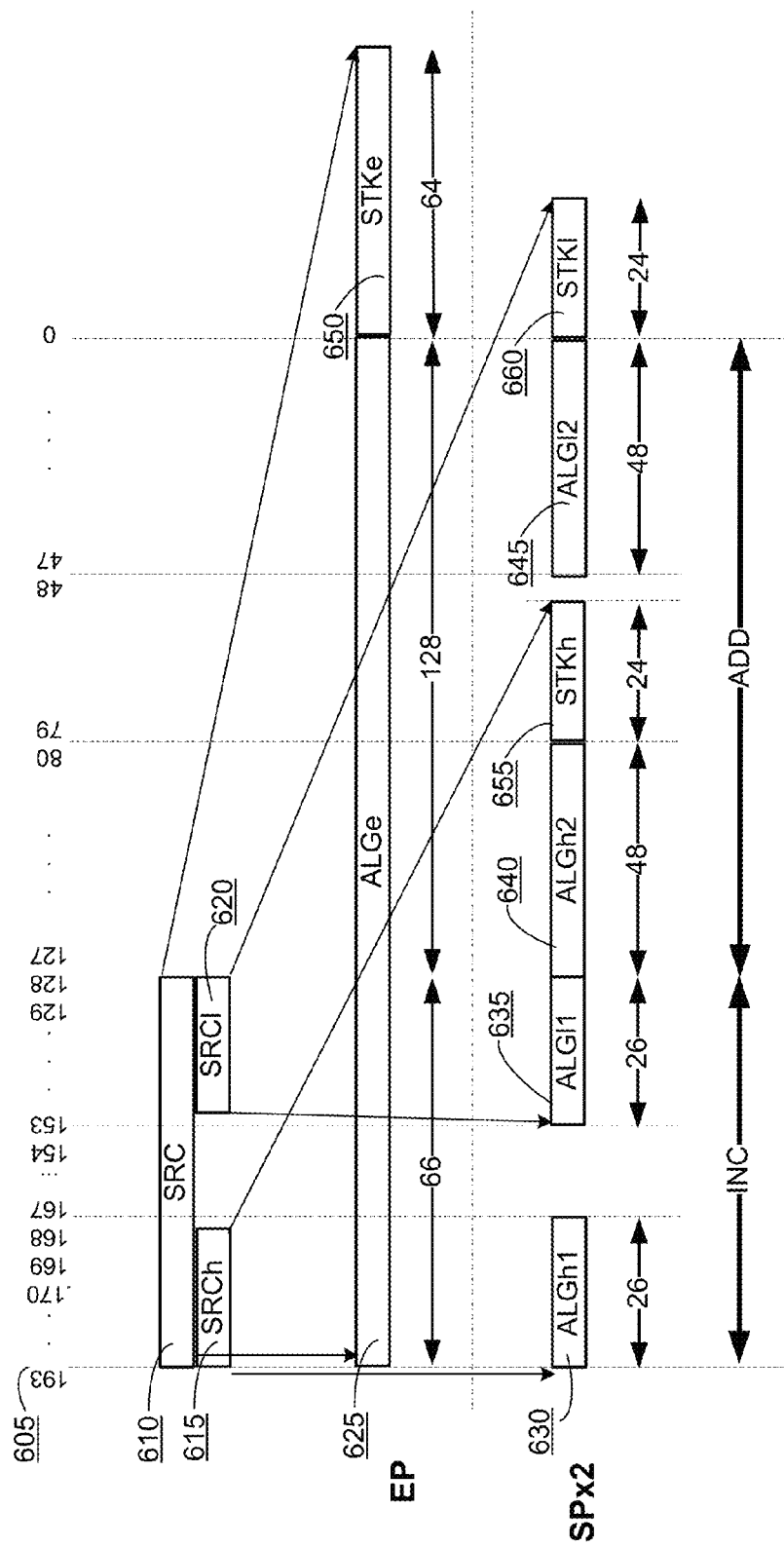
FIG. 6 illustrates a schematic diagram of data alignment using an FMAC, according to one exemplary embodiment.

Turning now to FIG. 6, a graphical representation of an illustrative side-by-side alignment of respective addends, post-alignment, for an EP (DP) operation and two parallel SP operations is depicted, in accordance with one embodiment. For illustrative convenience, bit numbers [193:0] 605 are shown alongside the alignments. In one embodiment, bit 193 is the most significant bit (MSB) and bit 0 is the least significant bit (LSB). As shown, an EP source addend portion 610, and one or two SP source addend portions 615, 620 (SP-hi and SP-lo, respectively) may be aligned. The EP source addend portion 610 may be 64 bits and the SP source addend portions 615, 620 may each be 24 bits. In one embodiment, aligner shifting is performed by shifting to the right. The most significant bit of SP-hi source addend portion 610 may be aligned with the most significant bit of the EP source addend portion 605. The least significant bit of SP-lo source addend portion 615 may be aligned with the least significant bit of the EP source addend portion 605.

The EP source addend portion 610 may have a corresponding EP aligner output 625, that may be, in one embodiment, 194 bits. The SP-hi source addend portion 615 may have a corresponding SP-hi incrementer aligner output 630, that may be, in one embodiment, 26 bits. The SP-hi incrementer aligner output 630 may have its most significant bit aligned with the most significant bit (bit 193) of the EP aligner output 625. The SP-lo source addend portion 620 may have a corresponding SP-lo incrementer aligner output 635, that may be, in one embodiment, 26 bits. The SP-lo incrementer aligner output 635 may have its least significant bit aligned with the one hundred twenty-eighth bit (bit 128) of the EP aligner output 625.

The SP-hi source addend portion 615 may have a corresponding SP-hi adder aligner output 640, that may be, in one embodiment, 48 bits. The SP-hi adder aligner output 640 may have its most significant bit aligned with the one hundred twenty-seventh bit (bit 127) of the EP aligner output 625. The SP-lo source addend portion 620 may have a corresponding SP-lo adder aligner output 645, that may be, in one embodiment, 48 bits. The SP-lo adder aligner output 645 may have its least significant bit aligned with the least significant bit (bit 0) of the EP aligner output 625. It should be noted that in one embodiment, if only one SP operation is needed, only the SP-lo may be used/needed to perform a single, single-precision (SP) operation.

In one or more embodiments, the aligner output fields 625, 640 and/or 645 may each have an accompanying sticky field 650 (EP), 655 (SP-hi), 660 (SP-lo) that may be adapted to facilitate rounding up and/or down to the nearest bit. That is, as bits are shifted out, the sticky fields 650 (EP), 655 (SP-hi), 660 (SP-lo) may keep track of the shifted out bits, and may perform an logical OR operation to influence rounding. In one embodiment, the sticky field 650 (EP) may comprise 64 bits, the sticky field 655 (SP-hi) may comprise 24 bits, and the sticky field 660 (SP-lo) may comprise 24 bits. In some embodiments, rounding may be performed up to the next bit if a sticky field indicates the shifted out bits are more than (or equal to) half way to the next bit, or down to the current bit if the associated sticky field indicates the shifted out bits are less than half way to the next bit. In alternate embodiments, such as those pertaining to accumulating, the rounding may be performed to a specific bit (current or next). It should be noted that the sticky fields described above may be used to maintain precision, but may not otherwise affect the end result of the operations described herein.

Figure 7:
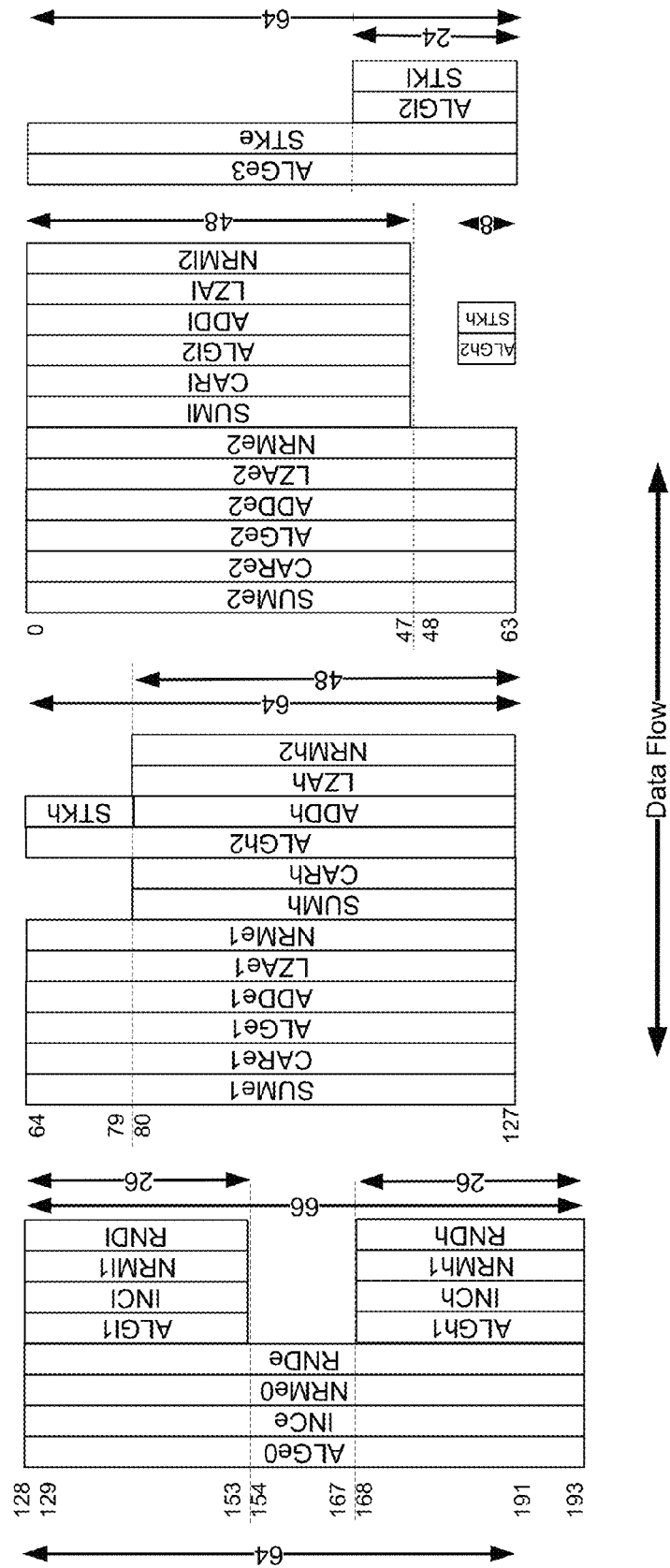
FIG. 7 illustrates a schematic diagram of FMAC mantissa fields in an aligned dataflow, according to one exemplary embodiment.

Turning now to FIG. 7, a schematic diagram of FMAC mantissa fields (and their respective bit lengths) in an aligned 64-bit dataflow is illustrated, according to one exemplary embodiment. The aligned datapath may be "folded" in order to comport with a 64-bit datapath bit pitch to align data efficiently through the processor and fit into a fixed physical footprint. It should be noted that the actual width of the aligned data may be greater than the width of the datapath, and in some cases may be three times the width of the datapath (e.g., the aligned data may be 194 bits wide, while the datapath width may be 64-bits wide). As shown in FIG. 7, various portions of data, such as those depicted in FIG. 6 and described above, may be transmitted on a datapath that is narrower than the data itself.

Figure 8:
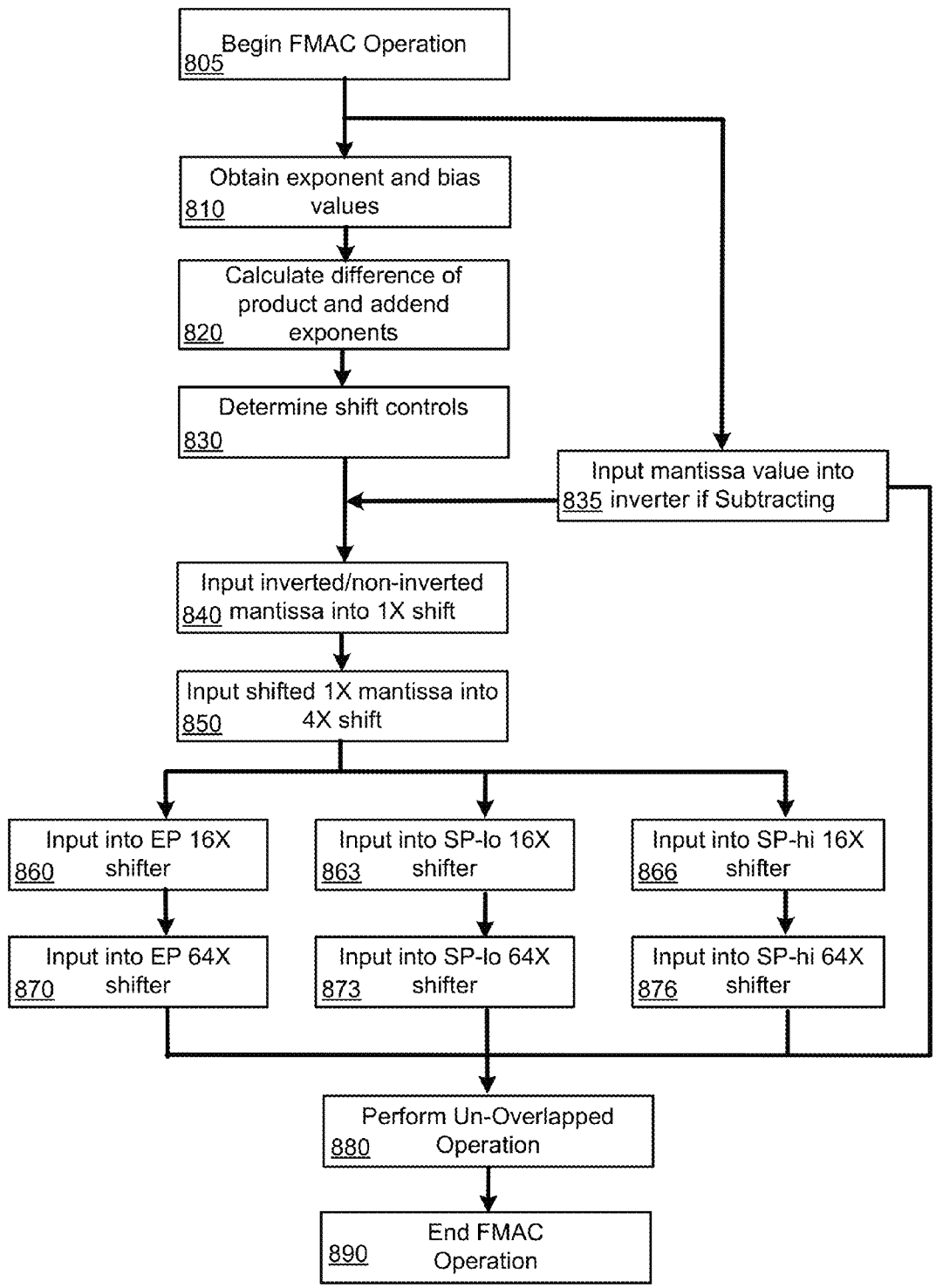
FIG. 8 illustrates a flowchart depicting steps for shifting and aligning data, according to one exemplary embodiment.

Turning to FIG. 8, a flowchart depicting steps for shifting and aligning data is shown, according to one exemplary embodiment. At 805, an FMAC operation may begin. The flow may proceed in parallel to 810 and 835. At 810, the exponent and bias values may be obtained. In one embodiment, the exponent values may be the Ea 556a, the Eb 556b and the Ec 556c, and the bias value may be the Bias 556d. The flow may proceed to 820 to calculate the difference between the product and addend exponents. In one embodiment, the adder 557 and the adder 559 may perform an effective subtraction operation between the sum of the product exponents (the Ea 556a and the Eb 556b) and the addend exponent (the Ec 556c). The flow may then proceed to 830 where the shift controls may be determined. In one embodiment, the shift controls may be based on (determined from) the output of the adder 559 as applied to the decoders 566a-n and the muxes 567, as shown in FIG. 5. From 830, the flow may proceed to 840. At 835, a mantissa value (e.g., the Mc 505) may be input into the invert block 510. In one embodiment, the mantissa input may be inverted if a subtraction operation is performed by the FMAC. From 835, the flow may proceed to 840 and/or to 880.

At 840, the inverted or non-inverted mantissa may be input into a 1× shifter (e.g., the Shift 1× 515). From 840, the flow may proceed to 850. At 850, the output of the 1× shifted mantissa may be input into the 4× shift block (e.g., the Shift 4× 520). From 850, the flow may proceed to 860, 863 and/or 866. At 860, the output of the 4× shift from 850 may be input into the 16× extended-precision shifter (e.g., 525). From 860, the flow may proceed to 870 where the output of the 16× shift from 860 may be input into the 64× extended-precision shifter (e.g., 530). From 870, the flow may proceed to 880. At 863, the output of the 4× shift from 850 may be input into the 16× single-precision lo shifter (e.g., 535). From 863, the flow may proceed to 873 where the output of the 16× shift from 863 may be input into the 64× single-precision lo shifter (e.g., 540). From 873, the flow may proceed to 880. At 866, the output of the 4× shift from 850 may be input into the 16× single-precision hi shifter (e.g., 545). From 866, the flow may proceed to 876 where the output of the 16× shift from 866 may be input into the 64× single-precision hi shifter (e.g., 550). From 876, the flow may proceed to 880. At 880, any un-overlapped product and addend mantissa cases may be aligned. From 880, the flow may continue to 890. At 890, the FMAC operation may be ended.

In accordance with one or more embodiments, the actions shown in FIG. 8 may be performed sequentially, in parallel, substantially in parallel or in alternate order(s) without departing from the spirit and scope of the embodiments presented herein.

It is also contemplated that, in some embodiments, different kinds of hardware descriptive languages (HDL) may be used in the process of designing and manufacturing very large scale integration circuits (VLSI circuits) such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., data storage units 160, RAMs 155 (including embedded RAMs), compact discs, DVDs, solid state storage and/or the like). In one embodiment, the GDSII data (or other similar data) may be adapted to configure a manufacturing facility (e.g., through the use of mask works) to create devices capable of embodying various aspects of the instant invention. In other words, in various embodiments, this GDSII data (or other similar data) may be programmed into a computer 100, processor 125/140 or controller, which may then control, in whole or part, the operation of a semiconductor manufacturing facility (or fab) to create semiconductor products and devices. For example, in one embodiment, silicon wafers containing FMACs with multi-precision mantissa aligners (e.g., an FMAC utilizing parallel single-precision operations, as described herein) may be created using the GDSII data (or other similar data).

It should also be noted that while various embodiments may be described in terms of precision mantissa aligners, it is contemplated that the embodiments described herein may have a wide range of applicability as would be apparent to one of skill in the art having the benefit of this disclosure.

The particular embodiments disclosed above are illustrative only, as the invention may be modified and practiced in different but equivalent manners apparent to those skilled in the art having the benefit of the teachings herein. Furthermore, no limitations are intended to the details of construction or design as shown herein, other than as described in the claims below. It is therefore evident that the particular embodiments disclosed above may be altered or modified and all such variations are considered within the scope and spirit of the claimed invention.

Accordingly, the protection sought herein is as set forth in the claims below.

What is claimed:

1. A processing device, that comprises:
   a first precision operation circuit to perform an operation of a first precision type;
   a second precision operation circuit to perform an operation of a second precision type different from the first precision type;
   a shared, bit-shifting circuit communicatively coupled to the first and second precision operation circuits;
   wherein the first precision operation circuit comprises a first single-precision bit-shifting portion and a second single-precision bit-shifting portion; and
   wherein the second precision operation circuit comprises a first extended-precision bit-shifting portion and a second extended-precision bit-shifting portion;
   an overlap portion communicatively coupled to the first precision operation circuit, to the second precision operation circuit, to the shared, bit-shifting circuit, and to an inverter portion; and
   a shift control portion communicatively coupled to the first precision operation circuit, to the second precision operation circuit, to the shared, bit-shifting circuit, and to the inverter portion, the shift control portion being configured to control one or more shifting operations of the processing device.

2. The processing device of claim 1, wherein the first precision type is single precision and the second precision type is one of double precision and extended precision.

3. The processing device of claim 1, further comprising a third precision operation circuit coupled to the overlap portion and to the shift control portion;
   wherein the third precision operation circuit comprises a third single-precision bit-shifting portion and a fourth single-precision bit-shifting portion further comprising a third precision operation circuit coupled to the overlap portion and to the shift control portion.

4. The processing device of claim 3, wherein the shift control portion comprises:
   at least one adder circuit configured to reduce a plurality of input signals to a smaller number of input signals; and
   one or more decoder circuits.

5. The processing device of claim 3, wherein the first precision operation circuit, the second precision operation circuit, and the third precision operating circuit are connected in parallel to the shared, bit-shifting circuit.

6. The processing device of claim 5, wherein the shared, bit-shifting circuit comprises a single-bit shifting portion and a four-bit shifting portion;
   wherein the first single-precision bit-shifting portion and the third single-precision bit-shifting portion each comprise a sixteen-bit shifting circuit;
   wherein the second single-precision bit-shifting portion and the fourth single-precision bit-shifting portion each comprise a sixty-four-bit shifting circuit; and
   wherein the first extended-precision bit-shifting portion comprises a sixteen-bit shifting circuit and the second extended-precision bit-shifting portion comprises a sixty-four-bit shifting circuit.

7. A non-transitory, computer readable storage device encoded with data that, when implemented in a manufacturing facility, adapts the manufacturing facility to create an apparatus, wherein the apparatus comprises:
   a first precision operation circuit to perform an operation of a first precision type;
   a second precision operation circuit to perform an operation of a second precision type; and
   a shared, bit-shifting circuit communicatively coupled to the first and second precision operation circuits;
   wherein the first precision operation circuit comprises a first single-precision bit-shifting portion and a second single-precision bit-shifting portion;
   wherein the second precision operation circuit comprises a first extended-precision bit-shifting portion and a second extended-precision bit-shifting portion;
   an overlap portion communicatively coupled to the first precision operation circuit, to the second precision operation circuit, to the shared, bit-shifting circuit, and to an inverter portion; and
   a shift control portion communicatively coupled to the first precision operation circuit, to the second precision operation circuit, to the shared, bit-shifting circuit, and to the inverter portion, the shift control portion being configured to control one or more shifting operations of the apparatus.

8. A non-transitory, computer readable storage device, as set forth in claim 7, wherein the first precision type is single precision and the second precision type is one of double precision and extended precision.

9. A non-transitory, computer readable storage device, as set forth in claim 7, encoded with data that, when implemented in a manufacturing facility, adapts the manufacturing facility to create an apparatus, further comprising a third precision operation circuit coupled to the overlap portion and to the shift control portion
   wherein the third precision operation circuit comprises a third single-precision bit-shifting portion and a fourth single-precision bit-shifting portion.

10. A non-transitory, computer readable storage device, as set forth in claim 9, encoded with data that, when implemented in a manufacturing facility, adapts the manufacturing facility to create an apparatus, wherein the shift control portion comprises:
    at least one adder circuit configured to reduce a plurality of input signals to a smaller number of input signals; and
    one or more decoder circuits.

11. A non-transitory, computer readable storage device, as set forth in claim 9, encoded with data that, when implemented in a manufacturing facility, adapts the manufacturing facility to create an apparatus, wherein the first precision operation circuit, the second precision operation circuit, and the third precision operating circuit are connected in parallel to the shared, bit-shifting circuit.

12. A non-transitory, computer readable storage device, as set forth in claim 11, encoded with data that, when implemented in a manufacturing facility, adapts the manufacturing facility to create an apparatus, wherein the shared, bit-shifting circuit comprises a single-bit shifting portion and a four-bit shifting portion;
    wherein the first single-precision bit-shifting portion and the third single-precision bit-shifting portion each comprise a sixteen-bit shifting circuit;
    wherein the second single-precision bit-shifting portion and the fourth single-precision bit-shifting portion each comprise a sixty-four-bit shifting circuit; and
    wherein the first extended-precision bit-shifting portion comprises a sixteen-bit shifting circuit and the second extended-precision bit-shifting portion comprises a sixty-four-bit shifting circuit.

\* \* \* \* \*